(12) United States Patent
Liu et al.

(10) Patent No.: US 9,348,479 B2
(45) Date of Patent: May 24, 2016

(54) SENTIMENT AWARE USER INTERFACE CUSTOMIZATION

(75) Inventors: Weipeng Liu, Beijing (CN); Matthew Robert Scott, Beijing (CN); Huihua Hou, Beijing (CN); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 13/315,047

(22) Filed: Dec. 8, 2011

(65) Prior Publication Data

US 2013/0152000 A1 Jun. 13, 2013

(51) Int. Cl.
*G06F 3/0481* (2013.01)
*G06F 3/048* (2013.01)
*G06F 9/44* (2006.01)
*H04M 1/725* (2006.01)

(52) U.S. Cl.
CPC .............. *G06F 3/048* (2013.01); *G06F 3/0481* (2013.01); *G06F 9/44* (2013.01); *G06F 9/4443* (2013.01); *G06F 2203/011* (2013.01); *H04M 1/72552* (2013.01); *H04M 1/72569* (2013.01)

(58) Field of Classification Search
CPC combination set(s) only.
See application file for complete search history.

(56) References Cited

U.S. PATENT DOCUMENTS

| | | | |
|---|---|---|---|
| 4,559,604 A | 12/1985 | Ichikawa et al. | |
| 5,796,866 A | 8/1998 | Sakurai et al. | |
| 5,873,107 A | 2/1999 | Borovoy et al. | |
| 5,987,415 A * | 11/1999 | Breese et al. | 704/270 |
| 5,995,928 A | 11/1999 | Nguyen et al. | |
| 6,014,638 A * | 1/2000 | Burge et al. | 705/7.29 |
| 6,076,056 A | 6/2000 | Huang et al. | |
| 6,085,160 A | 7/2000 | D'hoore et al. | |
| 6,092,044 A | 7/2000 | Baker et al. | |
| 6,236,964 B1 | 5/2001 | Tamura et al. | |
| 6,247,043 B1 | 6/2001 | Bates et al. | |
| 6,363,342 B2 | 3/2002 | Shaw et al. | |
| 6,377,965 B1 | 4/2002 | Hachamovitch et al. | |
| 6,408,266 B1 | 6/2002 | Oon | |
| 6,460,015 B1 | 10/2002 | Hetherington et al. | |
| 6,731,307 B1 * | 5/2004 | Strubbe et al. | 715/727 |
| 6,732,074 B1 | 5/2004 | Kuroda | |
| 6,801,893 B1 | 10/2004 | Backfried et al. | |

(Continued)

FOREIGN PATENT DOCUMENTS

CN 1851617 10/2006
CN 101276245 10/2008

(Continued)

OTHER PUBLICATIONS

U.S. Appl. No. 13/331,023; "Scenario-Adaptive Input Method Editor", Scott, et al.; filed Dec. 20, 2011.

(Continued)

*Primary Examiner* — Phenuel Salomon
(74) *Attorney, Agent, or Firm* — Sandy Swain; Micky Minhas; Lee & Hayes PLLC (57) ABSTRACT

The customization of an application user interface with a skin package based on context data that includes the emotional states of a user may strengthen the emotional attachment for the application by the user. The customization includes determining an emotional state of a user that is inputting content into an application. A skin package for the user interface of the application is selected based on the emotional state of the user. The selected skin package is further applied to the user interface of the application.

19 Claims, 7 Drawing Sheets

(56) References Cited

U.S. PATENT DOCUMENTS

| | | | |
|---|---|---|---|
| 6,941,267 B2 | 9/2005 | Matsumoto | |
| 6,963,841 B2 | 11/2005 | Handal et al. | |
| 7,069,254 B2 | 6/2006 | Foulger et al. | |
| 7,089,504 B1* | 8/2006 | Froloff | G06F 17/241 715/764 |
| 7,099,876 B1 | 8/2006 | Hetherington et al. | |
| 7,107,204 B1 | 9/2006 | Liu et al. | |
| 7,165,032 B2 | 1/2007 | Bellegarda | |
| 7,194,538 B1 | 3/2007 | Rabe et al. | |
| 7,224,346 B2 | 5/2007 | Sheng | |
| 7,277,029 B2 | 10/2007 | Thiesson et al. | |
| 7,308,439 B2 | 12/2007 | Baird et al. | |
| 7,353,247 B2* | 4/2008 | Hough et al. | 709/202 |
| 7,360,151 B1* | 4/2008 | Froloff | G06F 17/248 715/255 |
| 7,370,275 B2 | 5/2008 | Haluptzok et al. | |
| 7,389,223 B2 | 6/2008 | Atkin et al. | |
| 7,447,627 B2 | 11/2008 | Jessee et al. | |
| 7,451,152 B2 | 11/2008 | Kraft et al. | |
| 7,490,033 B2 | 2/2009 | Chen et al. | |
| 7,505,954 B2 | 3/2009 | Heidloff et al. | |
| 7,512,904 B2 | 3/2009 | Matthews et al. | |
| 7,555,713 B2 | 6/2009 | Yang | |
| 7,562,082 B2 | 7/2009 | Zhou | |
| 7,565,157 B1 | 7/2009 | Ortega et al. | |
| 7,599,915 B2 | 10/2009 | Hill et al. | |
| 7,676,517 B2 | 3/2010 | Hurst-Hiller et al. | |
| 7,689,412 B2 | 3/2010 | Wu et al. | |
| 7,725,318 B2 | 5/2010 | Gavalda et al. | |
| 7,728,735 B2* | 6/2010 | Aaron et al. | 340/573.1 |
| 7,752,034 B2 | 7/2010 | Brockett et al. | |
| 7,844,599 B2 | 11/2010 | Kasperski et al. | |
| 7,881,934 B2* | 2/2011 | Endo et al. | 704/251 |
| 7,917,355 B2 | 3/2011 | Wu et al. | |
| 7,917,488 B2 | 3/2011 | Niu et al. | |
| 7,930,676 B1* | 4/2011 | Thomas | 717/100 |
| 7,953,730 B1 | 5/2011 | Bleckner et al. | |
| 7,957,955 B2 | 6/2011 | Christie et al. | |
| 7,957,969 B2 | 6/2011 | Alewine et al. | |
| 7,983,910 B2* | 7/2011 | Subramanian et al. | 704/250 |
| 8,161,073 B2 | 4/2012 | Connor | |
| 8,230,336 B2 | 7/2012 | Morrill | |
| 8,539,359 B2* | 9/2013 | Rapaport et al. | 715/751 |
| 8,564,684 B2* | 10/2013 | Bai | 348/222.1 |
| 8,597,031 B2* | 12/2013 | Cohen et al. | 434/323 |
| 8,762,356 B1 | 6/2014 | Kogan | |
| 2002/0005784 A1* | 1/2002 | Balkin et al. | 340/573.1 |
| 2002/0188603 A1 | 12/2002 | Baird et al. | |
| 2003/0041147 A1 | 2/2003 | van den Oord et al. | |
| 2003/0160830 A1 | 8/2003 | DeGross | |
| 2003/0179229 A1* | 9/2003 | Van Erlach et al. | 345/744 |
| 2004/0220925 A1 | 11/2004 | Liu et al. | |
| 2004/0243415 A1 | 12/2004 | Commarford et al. | |
| 2005/0144162 A1 | 6/2005 | Liang | |
| 2005/0203738 A1 | 9/2005 | Hwang | |
| 2005/0216253 A1 | 9/2005 | Brockett | |
| 2006/0026147 A1 | 2/2006 | Cone et al. | |
| 2006/0167857 A1 | 7/2006 | Kraft et al. | |
| 2006/0190822 A1* | 8/2006 | Basson et al. | 715/700 |
| 2006/0204142 A1 | 9/2006 | West et al. | |
| 2006/0206324 A1 | 9/2006 | Skilling et al. | |
| 2006/0242608 A1 | 10/2006 | Garside et al. | |
| 2006/0248074 A1 | 11/2006 | Carmel et al. | |
| 2007/0016422 A1 | 1/2007 | Mori et al. | |
| 2007/0033269 A1 | 2/2007 | Atkinson et al. | |
| 2007/0050339 A1 | 3/2007 | Kasperski et al. | |
| 2007/0052868 A1 | 3/2007 | Chou et al. | |
| 2007/0088686 A1 | 4/2007 | Hurst-Hiller et al. | |
| 2007/0089125 A1* | 4/2007 | Claassen | 725/9 |
| 2007/0124132 A1 | 5/2007 | Takeuchi | |
| 2007/0150279 A1 | 6/2007 | Gandhi et al. | |
| 2007/0162281 A1 | 7/2007 | Saitoh et al. | |
| 2007/0167689 A1* | 7/2007 | Ramadas et al. | 600/300 |
| 2007/0192710 A1* | 8/2007 | Platz et al. | 715/764 |
| 2007/0208738 A1 | 9/2007 | Morgan | |
| 2007/0213983 A1 | 9/2007 | Ramsey | |
| 2007/0214164 A1 | 9/2007 | MacLennan et al. | |
| 2007/0233692 A1 | 10/2007 | Lisa et al. | |
| 2007/0255567 A1 | 11/2007 | Bangalore et al. | |
| 2008/0046405 A1 | 2/2008 | Olds et al. | |
| 2008/0167858 A1 | 7/2008 | Christie et al. | |
| 2008/0171555 A1 | 7/2008 | Oh et al. | |
| 2008/0189628 A1* | 8/2008 | Liesche et al. | 715/762 |
| 2008/0195645 A1 | 8/2008 | Lapstun et al. | |
| 2008/0195980 A1* | 8/2008 | Morris | 715/864 |
| 2008/0208567 A1 | 8/2008 | Brockett et al. | |
| 2008/0221893 A1 | 9/2008 | Kaiser | |
| 2008/0288474 A1 | 11/2008 | Chin et al. | |
| 2008/0294982 A1 | 11/2008 | Leung et al. | |
| 2008/0312910 A1 | 12/2008 | Zhang | |
| 2009/0002178 A1* | 1/2009 | Guday et al. | 340/573.1 |
| 2009/0043584 A1 | 2/2009 | Philips | |
| 2009/0043741 A1 | 2/2009 | Kim | |
| 2009/0077464 A1 | 3/2009 | Goldsmith et al. | |
| 2009/0128567 A1* | 5/2009 | Shuster | H04L 12/1827 345/473 |
| 2009/0154795 A1 | 6/2009 | Tan et al. | |
| 2009/0187824 A1* | 7/2009 | Hinckley | G06F 9/4446 715/711 |
| 2009/0210214 A1 | 8/2009 | Qian et al. | |
| 2009/0216690 A1 | 8/2009 | Badger et al. | |
| 2009/0222437 A1 | 9/2009 | Niu et al. | |
| 2009/0313239 A1 | 12/2009 | Wen et al. | |
| 2010/0005086 A1 | 1/2010 | Wang et al. | |
| 2010/0122155 A1 | 5/2010 | Monsarrat | |
| 2010/0138210 A1 | 6/2010 | Seo et al. | |
| 2010/0146407 A1* | 6/2010 | Bokor | G06F 3/011 715/757 |
| 2010/0169770 A1 | 7/2010 | Hong et al. | |
| 2010/0180199 A1 | 7/2010 | Wu et al. | |
| 2010/0217581 A1 | 8/2010 | Hong | |
| 2010/0217795 A1 | 8/2010 | Hong | |
| 2010/0245251 A1 | 9/2010 | Yuan et al. | |
| 2010/0251304 A1 | 9/2010 | Donoghue et al. | |
| 2010/0306139 A1 | 12/2010 | Wu et al. | |
| 2010/0306248 A1 | 12/2010 | Bao et al. | |
| 2010/0309137 A1 | 12/2010 | Lee | |
| 2011/0014952 A1* | 1/2011 | Minton | 455/566 |
| 2011/0041077 A1* | 2/2011 | Reiner | 715/745 |
| 2011/0060761 A1 | 3/2011 | Fouts | |
| 2011/0066431 A1 | 3/2011 | Ju et al. | |
| 2011/0087483 A1* | 4/2011 | Hsieh | G06F 17/27 704/9 |
| 2011/0107265 A1* | 5/2011 | Buchanan et al. | 715/835 |
| 2011/0131642 A1 | 6/2011 | Hamura et al. | |
| 2011/0137635 A1 | 6/2011 | Chalabi et al. | |
| 2011/0161080 A1 | 6/2011 | Ballinger et al. | |
| 2011/0161311 A1 | 6/2011 | Mishne et al. | |
| 2011/0173172 A1 | 7/2011 | Hong et al. | |
| 2011/0178981 A1 | 7/2011 | Bowen et al. | |
| 2011/0184723 A1 | 7/2011 | Huang et al. | |
| 2011/0188756 A1 | 8/2011 | Lee et al. | |
| 2011/0191321 A1 | 8/2011 | Gade et al. | |
| 2011/0202876 A1 | 8/2011 | Badger et al. | |
| 2011/0258535 A1 | 10/2011 | Adler, III et al. | |
| 2011/0289105 A1 | 11/2011 | Hershowitz | |
| 2011/0296324 A1* | 12/2011 | Goossens et al. | 715/763 |
| 2012/0016678 A1 | 1/2012 | Gruber et al. | |
| 2012/0019446 A1 | 1/2012 | Wu et al. | |
| 2012/0023103 A1 | 1/2012 | Soderberg et al. | |
| 2012/0029902 A1 | 2/2012 | Lu et al. | |
| 2012/0035932 A1 | 2/2012 | Jitkoff et al. | |
| 2012/0036468 A1 | 2/2012 | Colley | |
| 2012/0041752 A1 | 2/2012 | Wang et al. | |
| 2012/0060113 A1 | 3/2012 | Sejnoha et al. | |
| 2012/0060147 A1 | 3/2012 | Hong et al. | |
| 2012/0078611 A1* | 3/2012 | Soltani et al. | 704/9 |
| 2012/0113011 A1 | 5/2012 | Wu et al. | |
| 2012/0117506 A1 | 5/2012 | Koch et al. | |
| 2012/0143897 A1 | 6/2012 | Wei et al. | |
| 2012/0173222 A1 | 7/2012 | Wang et al. | |
| 2012/0222056 A1 | 8/2012 | Donoghue et al. | |
| 2012/0297294 A1 | 11/2012 | Scott et al. | |
| 2012/0297332 A1 | 11/2012 | Changuion et al. | |

(56) References Cited

U.S. PATENT DOCUMENTS

| | | | |
|---|---|---|---|
| 2013/0016113 A1* | 1/2013 | Adhikari et al. | 345/589 |
| 2013/0054617 A1 | 2/2013 | Colman | |
| 2013/0091409 A1 | 4/2013 | Jeffery | |
| 2013/0132359 A1 | 5/2013 | Lee et al. | |
| 2013/0159920 A1 | 6/2013 | Scott et al. | |
| 2013/0298030 A1 | 11/2013 | Nahumi et al. | |
| 2013/0346872 A1 | 12/2013 | Scott et al. | |
| 2014/0040238 A1 | 2/2014 | Scott et al. | |
| 2015/0106702 A1 | 4/2015 | Scott et al. | |
| 2015/0121291 A1 | 4/2015 | Scott et al. | |
| 2015/0161126 A1 | 6/2015 | Wang et al. | |

FOREIGN PATENT DOCUMENTS

| | | |
|---|---|---|
| CN | 101661474 | 3/2010 |
| CN | 102314441 | 1/2012 |
| WO | WO2010105440 | 9/2010 |

OTHER PUBLICATIONS

Ciccolini, "Baidu IME More Literate in Chinese Input," Published Sep. 15, 2011, http://www.itnews-blog.com/it/81630.html, 4 pgs.

"Google Releases Pinyin Converter", retrieved from <<http://blogoscoped.com/archive/2007-04-04-n49.html>>, Apr. 2007, 3 pages.

"Google Transliteration Input Method (IME) Configuration", retrieved at <<http://www.technicstoday.com/2010/02/google-transliteration-input-method-ime-configuration/>>, Feb. 2010, 13 pages.

Kumar, "Google launched Input Method editor—type anywhere in your language", retrieved at <<http://shoutingwords.com/google-launched-input-method-editor.html>>, Mar. 2010, 12 pages.

Lo, et al., "Cross platform CJK input Method Engine", IEEE International Conference on Systems, Man and Cybernetics, Oct. 6, 2002, 6 pages.

Millward, "Baidu Japan Acquires Simeji Mobile App Team, for Added Japanese Typing Fun", retrieved from <<http://www.techinasia.com/baidu-japan-simeiji/>>, Dec. 13, 2011, 3 pages.

Mohan et al., "Input Method Configuration Overview," Jun. 3, 2011, retrieved at <http://gameware.autodesk.com/documents/gfx_4.0_ime.pdf>>, 71 pages.

Scott, et al., "Engkoo: Mining theWeb for Language Learning", In Proceedings of the 49th Annual Meeting of the Association for Computational Linguistics: Human Language Technologies: Systems Demonstrations, Jun. 21, 2011, 6 pages.

Sowmya, et al., "Transliteration Based Text Input Methods for Telugu", Proceedings of 22nd International Conference on Computer Processing of Oriental Languages. Language Technology for the Knowledge-based Economy (ICCPOL), Mar. 2009, pp. 122-132.

Suematsu et al., "Network-Based Context-Aware Input Method Editor," Proceedings: Sixth International Conference on Networking and Services (ICNS), Mar. 7, 2010, 6 pages.

Windows XP Chinese Pinyin Setup, published Apr. 15, 2006, retrieved at <<http://www.pinyinjoe.com/pinyin/pinyin_setup.htm>>, pp. 1-10.

"Database", Microsoft Computer Dictionary, Fifth Edition, retrieved on May 13, 2011, at <<http://academic.safaribooksonline.com/book/communications/0735614954>>, Microsoft Press, May 1, 2002, 2 pages.

"Microsoft Computer Dictionary", Fifth Edition, retrieved on May 13, 2011, at <<http://academic.safaribooksonline.com/book/communications/0735614954>>, Microsoft Press, May 1, 2002, 2 pages.

Final Office Action for U.S. Appl. No. 13/109,021, mailed on Jan. 11, 2013, Scott et al., "Network Search for Writing Assistance", 16 pages.

Office action for U.S. Appl. No. 12/693,316, mailed on Oct. 30, 2013, Huang, et al., "Phonetic Suggestion Engine", 24 pages.

Office Action for U.S. Appl. No. 13/109,021, mailed on Aug. 21, 2012, Scott et al., "Network Search for Writing Assistance", 19 pages.

Office Action for U.S. Appl. No. 13/109,021, mailed on Sep. 25, 2013, Scott et al., "Network Search for Writing Assistance", 18 pages.

U.S. Appl. No. 12/960,258, filed Dec. 3, 2010, Wei, et al., "Wild Card Auto Completion".

U.S. Appl. No. 13/109,021, filed May 17, 2011, Scott et al., "Network Search for Writing Assistance".

Damper, "Self-Learning and Connectionist Approaches to Text-Phoneme Conversion", UCL Press, Connectionist Models of Memory and Language, Dec. 1995, 30 pages.

Gamon et al., "Using Statistical Techniques and Web Search to Correct ESL Errors," CALICO Journal, vol. 26, No. 3, May 2009, 21 pages.

Kumar, "Google launched Input Method editor—type anywhere in your language", retrieved at on Apr. 2, 2012 from <<http://shoutingwords.com/ google-launched-input-method-editor.htm>>, 12 pages.

"Google Scribe," retrieved on Feb. 3, 2011 at <<http://www.scribe.googlelabs.com/>>, 1 page.

"Microsoft Research ESL Assistant," retrieved on Feb. 3, 2011 at <<http://www.eslassistant.com/>>, 1 page.

Office action for U.S. Appl. No. 12/693,316, mailed on Jun. 19, 2013, Huang et al., "Phonetic Suggestion Engine", 20 pages.

"Search Engine", Microsoft Computer Dictionary, Mar. 2002 , Fifth Edition, p. 589.

Suzuki et al., "A Comparative Study on Language Model Adaptation Techniques using New Evaluation Metrics," Proceedings: HLT/EMNLP, Oct. 2005, 8 pages.

Wikipedia, "Selection Based Search", retrieved on Mar. 23, 2012 at <<http://en.wikipedia.org/wiki/Selection based search>>, 3 pgs.

Wikipedia, "Soundex", retrieved on Jan. 20, 2010 at <<http://en.wikipedia.org/wiki/soundex>>, 3 pgs.

U.S. Appl. No. 12/960,258, filed Dec. 3, 2010, Wei, et al., "Wild Card Auto Completion," 74 pages.

U.S. Appl. No. 13/109,021, filed May 17, 2011, Scott et al., "Network Search for Writing Assistance", 43 pages.

Gamon et al., "Using Statistical Techniques and Web Search to Correct ESL Errors," Published 2009, retrieved from <<http://research.microsoft.com/pubs/81312/Calico_published.pdf>>, CALICO Journal, vol. 26, No. 3, 2009, 21 pages.

"Google Scribe," retrieved at <<http://www.scribe.googlelabs.com/>>, retrieved date: Feb. 3, 2011, 1 page.

Komasu et al., "Corpus-based Predictive Text Input", Proceedings of the Third International Conference on Active Media Technology, May 2005, 6 pages.

"Microsoft Research ESL Assistant," retrieved at <<http://www.eslassistant.com/>>, retrieved date Feb. 3, 2011, 1 page.

Suzuki et al., "A Comparative Study on Language Model Adaptation Techniques using New Evaluation Metrics," Proceedings: HLT/EMNLP, Vancouver, Oct. 6-8, 2005, retrieved at <<http://www.aclweb.org/anthology/H/H05/H05-1034.pdf>>, 8 pages.

Ciccolini, Ramiro, "Baidu IME More literate in Chinese input," Published Sep. 15, 2011, retrieved at << http://www.itnews-blog.com/it/81630.html>>, 4 pages.

Office action for U.S. Appl. No. 13/567,305, mailed on Jan. 30, 2014, Scott, et al., "Business Intelligent In-Document Suggestions", 14 pages.

International Search Report & Written Opinion for PCT Patent Application No. PCT/US2013/053321, Mailed Date: Oct. 1, 2013, Filed Date: Aug. 2, 2013, 9 pages.

Office Action for U.S. Appl. No. 13/109,021, mailed on Mar. 11, 2014, Dyer, A.R., "Network Search for Writing Assistance," 18 pages.

Office action for U.S. Appl. No. 12/693,316, mailed on May 19, 2014, Huang et al., "Phonetic Suggestion Engine", 22 pages.

Office Action for U.S. Appl. No. 13/109,021, mailed on Jun. 19, 2014, Dyer, A.R., "Network Search for Writing Assistance," 42 pages.

"Prose", Dictionary.com, Jun. 19, 2014, 2 pgs.

Office action for U.S. Appl. No. 12/693,316, mailed on Oct. 16, 2014, Huang, et al., "Phonetic Suggestion Engine", 24 pages.

Office action for U.S. Appl. No. 13/586,267, mailed on Jan. 2, 2015, Scott et al., "Input Method Editor Application Platform", 19 pages.

(56) References Cited

OTHER PUBLICATIONS

Office action for U.S. Appl. No. 13/586,267, mailed on Jul. 31, 2014, Scott et al., "Input Method Editor Application Platform", 20 pages.
Non-Final Office Action for U.S. Appl. No. 13/331,023, mailed Aug. 4, 2014, Matthew Robert Scott et al., "Scenario-Adaptive Input Method Editor", 20 pages.
U.S. Appl. No. 13/63,5219, filed Sep. 14, 2011, Scott, et al., "Cross-Lingual Input Method Editor", 43 pages.
Dinamik-Bot, et al., "Input method", retrieved on May 6, 2015 at <<http://en.wikipedia.org/w/index.php?title=Input_method&oldid=496631911>>, Wikipedia, the free encyclopedia, Jun. 8, 2012, 4 pages.
Engkoo Pinyin Redefines Chinese Input, Published on: May 13, 2013, available at: <<http://research.microsoft.com/en-us/news/features/engkoopinyinime-051313.aspx>>, 3 pages.
"English Assistant", Published on: Apr. 19, 2013, available at: <<http://bing.msn.cn/pinyin/>>, 2 pages.
The European Office Action mailed Jun. 18, 2015 for European patent application No. 12879676.0, a counterpart foreign application of U.S. Appl. No. 13/635,306, 5 pages.
The Supplementary European Search Report mailed May 20, 2015 for European Patent Application No. 12879676.0, 3 pages.
"Innovative Chinese Engine", Published on: May 2, 2013, available at: <<http://bing.msn.cn/pinyin/help.shtml>>, 6 pages.
"Input Method (IME)", Retrieved on: Jul. 3, 2013, available at: <<http://www.google.co.in/inputtools/cloud/features/input-method.html>>, 6 pages.
International Search Report & Written Opinion for PCT Patent Application No. PCT/CN2013/081156, mailed May 5, 2014; filed Aug. 9, 2013, 14 pages.
Miessler, "7 Essential Firefox Quicksearches", Retrieved from <<https:danielmiessler.com/blog/7-essential-firefox-quicksearches/>>, Published Aug. 19, 2007, 2 pages.
Office action for U.S. Appl. No. 13/331,023, mailed on Feb. 12, 2015, Scott et al, "Scenario-Adaptive Input Method Editor", 20 pages.
Office action for U.S. Appl. No. 13/635,219, mailed on Mar. 13, 2015, Scott et al., "Cross-Lingual Input Method Editor", 21 pages.
Office action for U.S. Appl. No. 13/635,306, mailed on Mar. 27, 2015, Scott et al., "Input Method Editor", 18 pages.
Office action for U.S. Appl. No. 13/701,008, mailed on May 12, 2015, Wang et al., "Feature-Based Candidate Selection", 12 pages.
Office action for U.S. Appl. No. 13/586,267, mailed on May 8, 2015, Scott et al., "Input Method Editor Application Platform", 18 pages.
Office action for U.S. Appl. No. 13/701,008, mailed on Jun. 15, 2015, Wang et al., "Feature-Based Candidate Selection", 17 pages.
Office action for U.S. Appl. No. 13/331,023, mailed on Jun. 26, 2015, Scott et al., "Scenario-Adaptive Input Method Editor", 23 pages.
Office action for U.S. Appl. No. 13/635,306, mailed on Aug. 14, 2015, Scott et al., "Input Method Editor", 26 pages.
Office Action for U.S. Appl. No. 13/109,021, mailed on Sep. 30, 2014, Dyer, A.R., "Network Search for Writing Assistance," 17 pages.
PCT International Preliminary Report on Patentability mailed Mar. 12, 2015 for PCT Application No. PCT/CN2012/080749, 8 pages.
The Supplemenary European Search Report mailed Jul. 16, 2015 for European patent application No. 12880149.5, 5 pages.
Ben-Haim, et al., "Improving Web-based Image Search via Content Based Clustering", Proceedings of the 2006 Conference on Computer Vision and Pattern Recognition Workshop (CVPRW '06), IEEE, Jun. 17, 2006, 6 pages.
Berg, et al., "Animals on the Web", Proceedings of the 2006 IEEE Computer Society Conference on Computer Vision and Pattern Recognition (CVPR '06), vol. 2, IEEE, Jun. 17, 2006, pp. 1463-1470.
The European Office Action mailed Oct. 8, 2015 for European patent application No. 12879804.8, a counterpart foreign application of U.S. Appl. No. 13/586,267, 9 pages.
The European Office Action mailed Nov. 27, 2015 for European patent application No. 12880149.5, a counterpart foreign application of U.S. Appl. No. 13/635,219, 10 pages.
The Partial Supplemenary European Search Report mailed Oct. 26, 2015 for European patent application No. 12883902.4, 7 pages.
The Supplementary European Search Report mailed Nov. 12, 2015 for European patent application No. 12880149.5, 7 pages.
The Supplemenary European Search Report mailed Sep. 14, 2015 for European patent application No. 12879804.8, 5 pages.
Guo et al., "NaXi Pictographs Input Method and WEFT", Journal of Computers, vol. 5, No. 1, Jan. 2010, pp. 117-124.
Office action for U.S. Appl. No. 13/331,023 mailed on Nov. 20, 2015, Scott et al., "Scenario-Adaptive Input Method Editor", 25 pages.
Office action for U.S. Appl. No. 13/586,267 mailed Nov. 6, 2015, Scott et al., "Input Method Editor Application Platform", 22 pages.
Office action for U.S. Appl. No. 13/635,219, mailed on Sep. 29, 2015, Scott et al., "Cross-Lingual Input Method Editor", 14 page.

\* cited by examiner

SENTIMENT AWARE USER INTERFACE CUSTOMIZATION

BACKGROUND

Users of popular applications, such as language input method editor applications, may develop emotion attachments with such applications. A user may express an emotional attachment with an application by customizing a visual appearance of the user interface provided by the application. Such customization is commonly referred to as "skinning", and may be achieved with the use of custom graphics that alter the appearance of the user interface. Other skinning technologies may include the application of animation and sound to the user interface of the application.

SUMMARY

Described herein are techniques for adaptively applying skins to a user interface of an application based on the emotional sentiment of a user that is using the application. A skin may alter the user's interactive experience with the user interface by supplementing the user interface with custom images, animation and/or sounds. Accordingly, by adaptively applying skins to the user interface, the look and feel of the user interface may be changed to correspond to the user's emotional sentiment throughout the usage of the application by the user.

The emotional state of the user may be detected based in part on content that the user inputs into the application or communication that the user transmits through the application. In this way, the sentiment aware skin customization of the application user interface may strengthen the emotional attachment for the application by the user. Accordingly, the user may become or remain a loyal user of the application despite being offered similar applications from other vendors. Sentiment aware skin customization may be applied to a variety of software. Such software may include, but are not limited to, office productivity applications, email applications, instant messaging client applications, media center applications, media player applications, and language input method editor applications. Language input method editor applications may include applications that are used for non-Roman alphabet character inputs, such as inputs of Chinese, Japanese, and/or Korean.

In at least one embodiment, the customization of a user interface of the application includes determining an emotional state of a user that is inputting content into an application. A skin package for the user interface of the application is selected based on the emotional state of the user. The selected skin package is further applied to the user interface of the application.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The embodiments described herein pertain to techniques for adaptively applying skins to a user interface of an application based on the emotional sentiment of a user that is using the application. A skin may alter the user's interactive experience with the user interface of an application by supplementing the user interface with custom images, animation and/or sounds. Accordingly, by adaptively applying skins to the user interface, the look and feel of the user interface may be changed to correspond to the user's emotional sentiment throughout the usage of the application by the user. The emotional state of the user may be determined from content that the user inputs into the application or communication that the user transmits through the application, in conjunction with other sources of data. The sentiment aware skin customization of the user interface of the application may strengthen the emotional attachment for the application by the user.

Sentiment aware skin customization may be applied to a variety of software. Such software may include, but are not limited to, office productivity applications, email applications, instant messaging client applications, media center applications, media player applications, and language input method editor applications. Language input method editor applications may include applications that are used for non-Roman alphabet character inputs, such as inputs of Chinese, Japanese, and/or Korean. Various examples of techniques for implementing sentiment aware user interface customization in accordance with the embodiments are described below with reference to FIGS. 1-7.

Example Scheme

Figure 1:
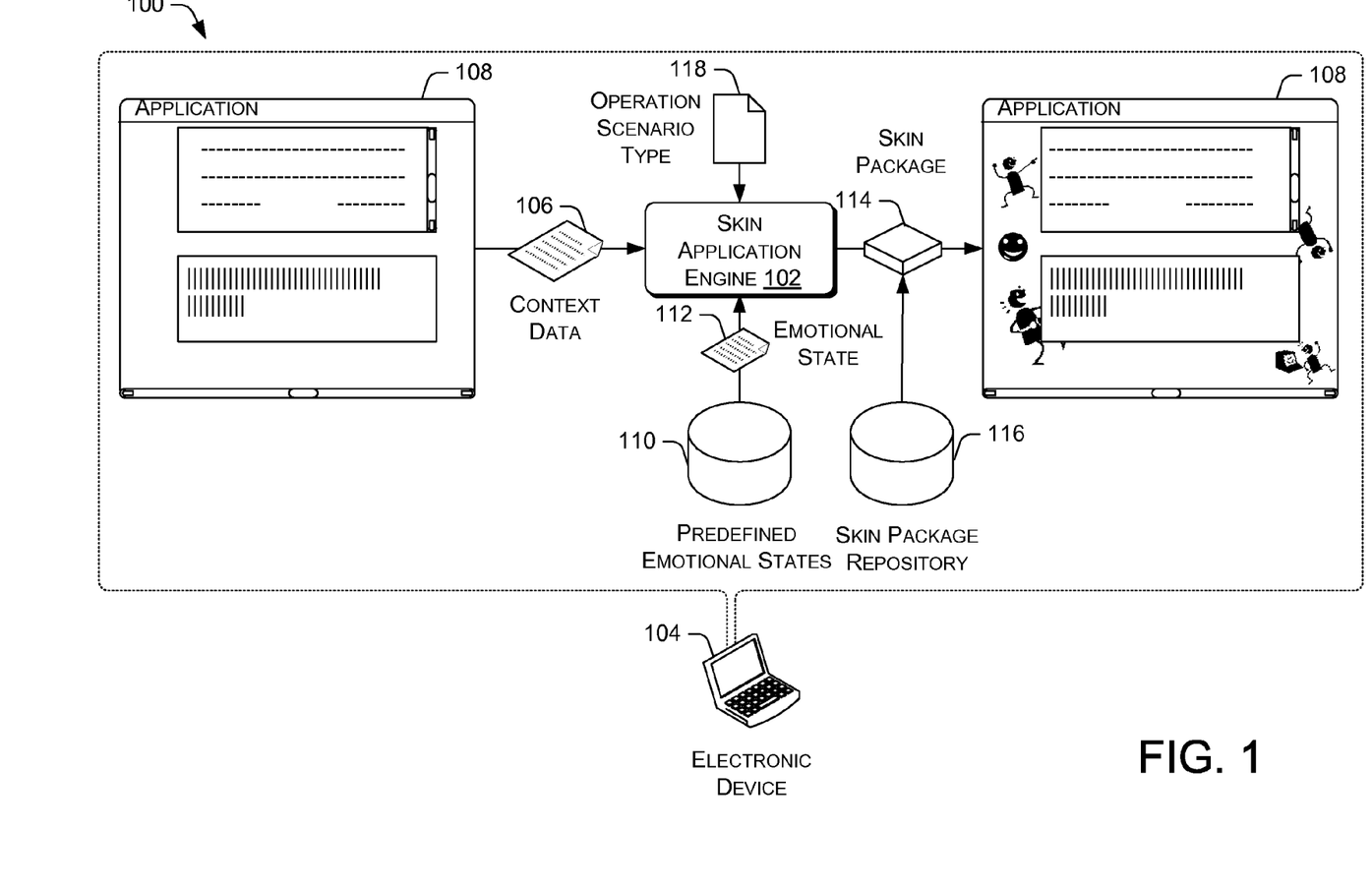
FIG. 1 is a block diagram that illustrates an example scheme that implements sentiment aware user interface customization.

FIG. 1 is a block diagram that illustrates an example scheme 100 for implementing a skin application engine 102 that performs sentiment aware user interface customization. The skin application engine 102 may be implemented by an electronic device 104. The skin application engine 102 may acquire context data 106. The context data 106 may be acquired from an application 108 that is operating on the electronic device 104, as well as from other sources. The context data 106 may include user inputs of content into the application 108. For example, in a scenario in which the application is an instant message client application, the user inputs may include a current message that a user is typing and/or previous messages that the user has transmitted through the instant message client application.

The context data 106 may further include application specific data and environmental data. The application specific data may include the name and the type of the application, and/or a current state of the application (e.g., idle, receiving input, processing data, outputting data). The environment data may include data on the real-world environment. For example, the environmental data may include a time at each time the user inputs content, the weather at each time the user inputs content. The environmental data may also concurrently or alternatively include current system software and/or hardware status or events of the electronic device 104. Additionally, the context data 106 may include user status data collected from personal web services used by the user. The collected user status data may provide explicit or implicit clues regarding the emotional state of the user at various times.

Once the skin application engine 102 has acquired the context data 106, the skin application engine 102 may classify the context data 106 into one of multiple predefined emotional states 110, such as the emotional state 112. The predefined emotional states may include emotional states such as happiness, amusement, sadness, anger, disappointment, frustration, curiosity, and so on and so forth. The skin application engine 102 may then select a skin package 114 from the skin package repository 116 that is best suited to the emotional state 112 and an operation scenario type 118 of the application 108. Each of the skin packages in the skin package repository 116 may include images, animation and/or sound. Accordingly, the selected skin package 114 may provide a full multimedia experience to the user. In some instances, the skin package 114 that is selected by the skin application engine 102 may reflect the emotional state 112. In other instances, the skin application engine 102 may select the skin package 114 to alter the emotional state 112. Subsequently, the skin application engine 102 may apply the selected skin package 114 to the user interface of the application 108. In various embodiments, the skin application engine 102 may apply other skin packages from the skin package repository 116 to the user interface of the application 108 based on changes in the determined emotional state of the user.

Electronic Device Components

Figure 2:
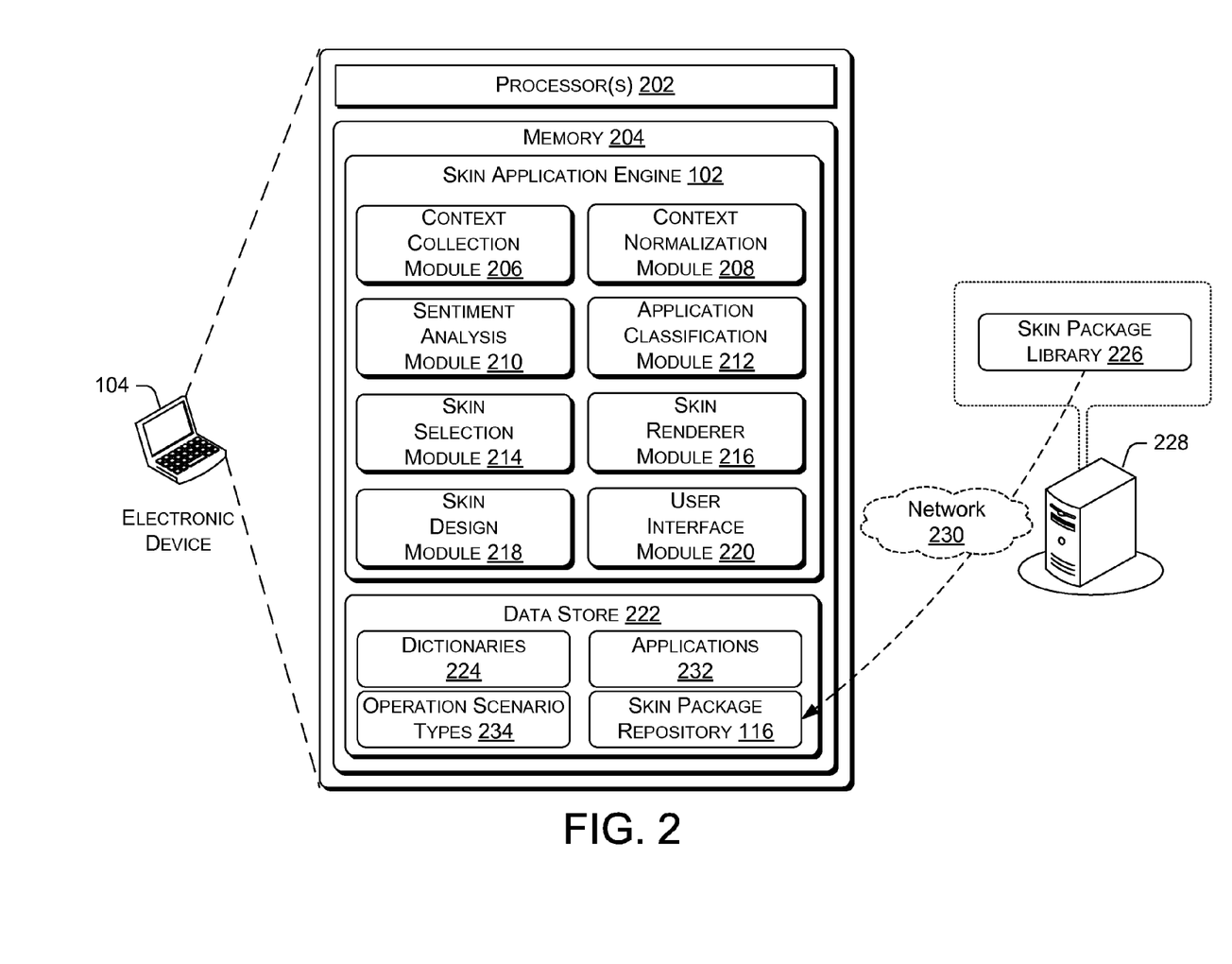
FIG. 2 is an illustrative diagram that shows the example components of a skin application engine that provides sentiment aware user interface customization.

FIG. 2 is an illustrative diagram that shows the example components of a skin application engine 102 that provides sentiment aware user interface customization. The skin application engine 102 may be implemented by the electronic device 104. In various embodiments, the electronic device 104 may be a general purpose computer, such as a desktop computer, a tablet computer, a laptop computer, a server, and so forth. However, in other embodiments, the electronic device 104 may be one of a camera, a smart phone, a game console, a personal digital assistant (PDA), or any other electronic device that interacts with a user via a user interface.

The electronic device 104 may includes one or more processors 202, memory 204, and/or user controls that enable a user to interact with the electronic device. The memory 204 may be implemented using computer readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media. The electronic device 104 may have network capabilities. For example, the electronic device 104 may exchange data with other electronic devices (e.g., laptops computers, servers, etc.) via one or more networks, such as the Internet.

The one or more processors 202 and the memory 204 of the electronic device 104 may implement components that include a context collection module 206, a context normalization module 208, a sentiment analysis module 210, an application classification module 212, a skin selection module 214, a skin renderer module 216, a skin design module 218, and a user interface module 220. The memory 204 may also implement a data store 222.

The context collection module 206 may collect the context data 106 from the application 108, the electronic device 104, and/or other sources. The context data 106 may include user inputs of content into the application 108 in a recent time period (e.g., a time period between 10 minutes ago and the current time). For example, in a scenario in which the application is an instant message client application, the user inputs may include a current message that a user is typing and/or previous messages that the user has transmitted through the instant message client application. In another example, the user inputs may be text that is inputted into a word processing application in the recent time period. In various embodiments, the context collection module 206 may extract emotion terms from the user inputs as context data. The emotion terms may be verbs, adjectives, or other descriptors that may explicitly or implicitly reflect the emotional state of the user. In such embodiments, the context collection module 206 may use machine learning techniques, such as natural language processing (NLP), computational linguistics, and/or text analytics to recognize and extract such emotion terms.

In some embodiments, the context collection module 206 may have the ability to extract emotion terms from user inputs that are in different languages. In such embodiments, the context collection module 206 may use one of the dictionaries 224 to recognize and translate non-English words or characters that are inputted by the user into standard English words, and then perform the emotion term extraction. However, the emotion term extraction may also be performed by using another language as the standard language in alternative embodiments. For example, the context collection module 206 may perform the translation of user inputs and emotion term extraction according to languages such as Spanish, French, Chinese, Japanese, etc.

The context data 106 that is collected by the context collection module 206 may further include application specific data. The application specific data may include the name and the type of the application. For example, the name of the application may be the designated or the trademark name of the application. The type of the application may be a general product category of the application, e.g., productivity, business communication, social networking, entertainment, etc. The application specific data may also include states of the application in a recent time period. In the example above, the application specific data may include an instant messaging status message (e.g., online, away, busy, etc.), a status of the application (e.g., application recently opened, updated, last used, etc.), and/or so forth.

The context data 106 may further include environmental data. The environment data may include a time at each time the user inputs content, the weather at each time the user inputs content, and other environmental indices at each time the user inputs content. The context collection module 206 may obtain such environmental data from service applications (e.g., a clock application, weather monitoring application, etc.) that are installed on the electronic device 104. The environmental data may also include system software and/or hardware status or events of the electronic device 104 in a recent time period. For example, the system status of the electronic device 104 may indicate how recently the electronic device 104 was turned on, the idle time of the electronic device 104 prior to a current user input of content, current amount and type of system resource utilization, recent system error messages, and/or so forth.

The context data 106 may further include user status data from a recent time period. The context collection module 206 may acquire the user status data from personal web services used by the user. For example, the user status data may include social network service profile information, messages exchanged with other social network members, and/or postings on a blog page or a forum. Such user status data may provide explicit or implicit clues regarding the emotional state of the user at various times. Accordingly, the context collection module 206 may obtain the clues by performing emotion term extraction on the profiles, messages, and/or postings as described above, with the implementation of appropriate language translations.

In some embodiments in which the application 108 is a communication application, the context collection module 206 may be configured to obtain context data related to an interlocutor that is exchanging communications with the user rather than collecting context data on the user. For example, the communication application may be an instant messaging client application. In such embodiments, an electronic device used by the interlocutor who is exchanging communications with the user via a corresponding communication application may have a counterpart skin application engine installed. The counterpart skin application engine may be similar to the skin application engine 102. Accordingly, the context collection module 206 may be configured to obtain context data, such as the content inputted by the interlocutor, user status, etc., from the counterpart skin application engine. In this way, a skin package that is selected based on the emotional state of the interlocutor may be eventually applied to the user interface of the application 108.

In various embodiments, the context collection module 206 is configured to collect the context data related to a user, such as the application specific data, the environmental data, the user status data, from the user after obtaining permission from the user. For example, when a user elects to implement the sentiment aware user interface skinning for the application 108, the context collection module 206 may display a dialog box that indicates to the user that personal information is to be collected from the user, identifying each source of information. In this way, the user may be given the opportunity to terminate the implementation of the sentiment aware user interface skinning for the application 108. In some embodiments, after the user consents, the context collection module 206 may display one or more other dialog boxes that further enable the user to selectively allow the context collection module 206 to collect context data from designated sources. For example, the user may allow the context collection module 206 to collect user inputs of content to one or more specific applications, but not user inputs of content into other applications. In another example, the user may allow the context collection module 206 to collect the user inputs and the application specific data, but deny the context collection module 206 permission to collect the user status data. Accordingly, the user may be in control of safeguarding the privacy of the user while enjoying the benefits of the sentiment aware user interface skinning.

The context normalization module 208 may normalize the collected context data, such as the context data 106, into context features. Each of the context features may be expressed as a name value pair. In one instance, a name value pair may be "weather: 1", in which the value "1" represents that the weather is sunny. In another instance, a name value pair may be "application type: 3", in which the value "3" represents that the application 108 is a instant messaging client application. In a further instance, a name value pair may be "emotion term: 12434", in which the emotion term is a word or phrase that the context collection module 206 extracted from a user input. In such an instance, the value "12434" may represent the word "happy". Accordingly, the context normalization module 208 may continuously receive context data from the content collector module 206, and normalize the context data into context features for analysis by the sentiment analysis module 210.

The sentiment analysis module 210 may classify the normalized context data in the form of context features into one of the predefined emotional states 110. The context data may be the context data 106. The sentiment analysis module 210 may also generate a confidence value for the classification. The classification confidence value may be expressed as a percentage value or a numerical value in a predetermined value scale. For example, the sentiment analysis module 210 may classify a set of context features as corresponding to a predefined emotional state of "happy" with a classification confidence value of "80%".

In various embodiments, the sentiment analysis module 210 may use one or more machine learning or classification algorithms to classify the context features into one of the predefined emotional states 110 and generate a corresponding classification confidence value. The machine learning algorithms may include supervised learning algorithms, unsupervised learning algorithms, semi-supervised learning algorithms, and/or so forth. The classification algorithms may include support vector machines, neural networks, expert systems, Bayesian belief networks, fuzzy logic, data fusion engine, and/or so forth. In other embodiments, the sentiment analysis module 210 may employ one or more of directed and undirected model classification approaches, such as naïve Bayes, Bayesian networks, decision trees, neural networks, fuzzy logic models, and/or other probabilistic classification models to achieve these goals.

The application classification module 212 may determine an operation scenario type 118 of the application 108 using a heuristic engine. Each of the operation scenario types may have a corresponding level of usage formality. The heuristic engine may be periodically updated by an external application information service so that the heuristic engine may stay current on the latest updates and changes to the application 108. Accordingly, the heuristic engine may continuously or periodically poll the application 108 for application information during the usage of the application 108 by a user. The application information may include data such as application process names, field classes, an application object model, and screen pixel information of the output data that is generated by the application and presented on a display. Based on such application information, and using visual interpretation techniques such as optical character recognition (OCR), the heuristic engine may leverage heuristic rules and statistical information to determine that the application 108 is operating in one of multiple operation scenario types. For example, the multiple operation scenario types may include an "online chat" operation scenario type, a "document authoring" operation scenario type, an "email composition" operation scenario type, and so forth.

The heuristic engine of the application classification module 212 may also assign a type confidence value to the classification of the application into an operation scenario type. The type confidence value may be expressed as a percentage value or a numerical value in a predetermined value scale. For example, the application classification module 212 may classify the application 108 into the "online chat" operation scenario type with a type confidence value of "90%".

The skin selection module 214 may select a skin package from the skin package repository 116 based on the determined emotional state of the user and the determined operation scenario type of the application 108, as well as their respect confidence values. In various embodiments, the skin selection module 214 may assess whether the classification confidence value of a classified emotional state meets a corresponding predefined confidence threshold. If the classification confidence value of the emotional state is below the predefined confidence threshold, the skin selection module 214 may consider the emotional state of the user as unknown. However, if the classification confidence value of the emotional state meets or is above the predefined confidence threshold, the skin selection module 214 may determine that the user is in the emotional state.

Likewise, the skin selection module 214 may assess whether the type confidence value of a classified operation scenario type of the application 108 meets a corresponding predefined confidence threshold. If the type confidence value of the operation scenario type is below the predefined confidence threshold, the skin selection module 214 may consider the operation scenario type of the application 108 as unknown. However, if the type confidence value of the operation scenario type meets or is above the predefined confidence threshold, the skin selection module 214 may determine that the application 108 has the operation scenario type.

Accordingly, once the skin selection module 214 has determined the emotional state, the skin selection module 214 may select a skin package that is mapped to the emotional state. In some embodiments, the skin package selected by the skin selection module 214 may correspond to the emotional state. For example, a "happy" skin package that shows cheerful images may be selected by the skin selection module 214 when the emotional state of the user of the application 108 is classified as "happy." In other embodiments, the skin selection module 214 may be configured to select a skin package to alter the emotional state of the user. For example, when the emotional state of the user is classified as "sad", the skin selection module 214 may select the "happy" skin package as a way to cheer up the user.

The selection of the skin package may be further based on the determined operation scenario type. Such selection of a skin package may be implemented when there are multiple skin packages with different levels of usage formality mapped to the same emotional state. For example, when the emotional state of the user is determined to be "happy", the skin selection module 214 may select a more formal "happy" skin package when the determined operation scenario type of the application 108 is "document authoring." In contrast, the skin selection module 214 may select a less formal "happy" skin package for the "happy" emotional state when the determined operation scenario type of the application 108 is "online chat". The usage formality of a skin package may refer to the appropriateness of the skin package content (e.g., images, sounds, animation) in different social contexts. For instance, a more formal skin package is more likely to be acceptable in a professional environment but may be perceived as awkward or out of place in a causal social environment. In contrast, a less formal skin package is less likely to be acceptable in a professional social environment, but is more likely to be acceptable in a casual social environment. In some embodiments, when the operation scenario type of the application 108 is determined to be unknown, and there are multiple skin packages that correspond to the determined emotional state, the skin selection module 214 may select the most formal skin package that corresponds to the emotional state.

The mapping of skin packages in the skin package repository 116 to emotional states may enable the skin selection module 214 to select skin packages as described above. The mapping may be stored in the metadata of each skin package. In some instances, a single skin package may be mapped to multiple emotional states. For example, a "happy" skin package may be mapped to both the "happy" emotional state and the "amused" emotional state. Thus, such a "happy" skin package may be selected by the skin selection module 214 for either of the emotional states. In other instances, a single emotional state may be mapped to multiple skin packages. For example, as described above, two "happy" skin packages with different levels of usage formality may be mapped to the same "happy" emotional state. In additional instances, a combination of the above mappings of skin packages to emotional states may be present in the skin package repository 116.

In some embodiments, there may be a designated default skin package that is selected by the skin selection module 214 when the emotional state of the user is ascertained to be unknown, such as in a scenario in which a classified emotional state has a low confidence value. The skin selection module 214 may also select the default skin package when no skin package has been mapped to a particular determined emotional state of the user. The default skin package may include neutral content that may be suitable for various emotional states.

It will be appreciated that since the skin selection module 214 takes the classification confidence value of a classified emotional state into consideration when selecting a skin package, abrupt or unwarranted changes in skin selection may be reduced. Accordingly, the classification confidence value used by the skin selection module 214 may be adjusted to balance timeliness of changes in user interface appearance in response to emotional state detection with annoyance that frequent user interface appearance changes may bring to the user.

The skin renderer module 216 may apply the skin package selected by the skin selection module 214 to the user interface of the application 108. For example, the skin renderer module 216 may apply the skin package 114 to the user interface. The skin package 114 may include images, sounds, and/or animation that provide a rich multimedia emotional experience for the user. Thus, the application of the skin package 114 may change the user interface appearance of the application 108, as well as provide additional features that are previously unavailable in the user interface of the application 108. Such additional features may include the ability to play certain sounds or animate a particular portion of the user interface.

In some embodiments, the skin package 114 may include a sentiment engine that plays different sounds and/or displays different animations based on the emotion terms detected by the context collection module 206. For example, when the context collection module 206 informs the sentiment engine that the user has inputted the word "happy" into the application 108, the sentiment engine may cause the applied skin to play a laughter sound track and/or move an animated smiley face across the user interface of the application 108. In other words, the sentiment engine that is included in the skin package 114 may leverage functions of the skin application engine 102 (e.g., the context collection module 206) to enhance the features provided by the skin package 114.

In certain embodiments, the images and animations that are provided by the skin package 114 may be displayed outside of the user interface of the application 108. For example, when the user interface of the application 108 is a window that occupies a portion of a displayed desktop work area, an animation in the skin package 114 may dance across the entire width of the desktop work area, rather than just the portion occupied by the user interface. In another example, an image in the skin package 114 may protrude from the user interface of the application 108, or otherwise modify the boundaries of the user interface of the application 108.

The skin design module 218 may enable the user to design skin packages. In various embodiments, the skin design module 218 may include a skin design assistant functionality. The assistant functionality may present the user with a sequence of user interface dialog boxes and/or skin design templates that lead the user through a series of steps for designing a skin package. In various instances, the assistant functionality may enable the user to create images, animation, and/or sounds, and then integrate the created content into a particular skin package. Alternatively or concurrently, the assistant functionality may enable the user to associate images, animation, and/or sounds selected from a library of such content to create the particular skin package. In some instances, the assistant functionality may also enable the user to incorporate a sentiment engine in the skin package. The assistant functionality may further enable the user to input metadata regarding each created skin package.

The metadata inputted for a created skin package may map the skin package to a corresponding emotional state (e.g., happy, sad, etc.) and/or a corresponding operation scenario type (e.g., document authoring, online chat, etc.). In some instances, the metadata inputted for the created skin package may also include configuration data that enable a sentiment engine that is included in the skin package to play different sounds or displays different animation based on the emotion terms detected by the context collection module 206. The inputted metadata may be saved as a part of the created skin package. For example, the metadata may be saved as an extensible markup language (XML) file that is included in the created skin package.

The user interface module 220 may enable the user to interact with the modules of the skin application engine 102 using a user interface (not shown). The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

In some embodiments, the user may adjust the threshold values used by the skin selection module 214 via the user interface module 220. Further, the user interface module 220 may provide a settings menu. The settings menu may be used to adjust whether the skin selection module 214 is to select a skin package that corresponds to the emotional state of the user or a skin package that alters the emotional state of the user. The user interface module 220 may also enable the user to specify through one or more dialog boxes the type of context data (e.g., user inputs, environmental data, application specific data, etc.) that the user allows the context collection module 206 to collect, and/or one or more applications from which user inputs may be collected. In other embodiments, the user interface module 220 may display the user interface of the skin design module 218.

In other embodiments, the user interface module 220 may enable the user to select skin packages from a skin package library 226 that resides on a server 228, and download the skin packages to the electronic device 104 via a network 230. For example, the skin package library 226 may be a part of an online store, and the user may purchase or otherwise acquire the skin packages from the online store. The downloaded skin packages may be stored in the skin package repository 116. The network 230 may be a local area network ("LAN"), a larger network such as a wide area network ("WAN"), and/or a collection of networks, such as the Internet. Protocols for network communication, such as TCP/IP, may be used to implement the network 230.

The data store 222 may store the dictionaries 224 that are used by the context collection module 206. Additionally, the data store 222 may also store applications 232 that may be skinned by the skin application engine 102. The applications 232 may include the application 108. Further, the skin package repository 116 may be stored in the data store 222. The data store 222 may further store additional data or other intermediate products that are generated or used by various components of the skin application engine 102, such the context data 106, the operation scenario types 234, and the predefined emotional states 110.

While the context normalization module 208, the sentiment analysis module 210, and the skin selection module 214 are described above as being implemented on the electronic device 104, such modules may also be implemented on a server in other embodiments. For example, the server may be the networked server 228, or any server that is part of computing cloud. In other words, the analysis of context data and the selection of an emotional skin package may be performed by a computing device that is separate from the electronic device 104. Likewise, while the skin design module 218 is described above as being part of the skin application engine 102, the skin design module 218 may be a standalone skin design application in other embodiments. The standalone skin design application may be implemented on another computing device.

Figure 3:
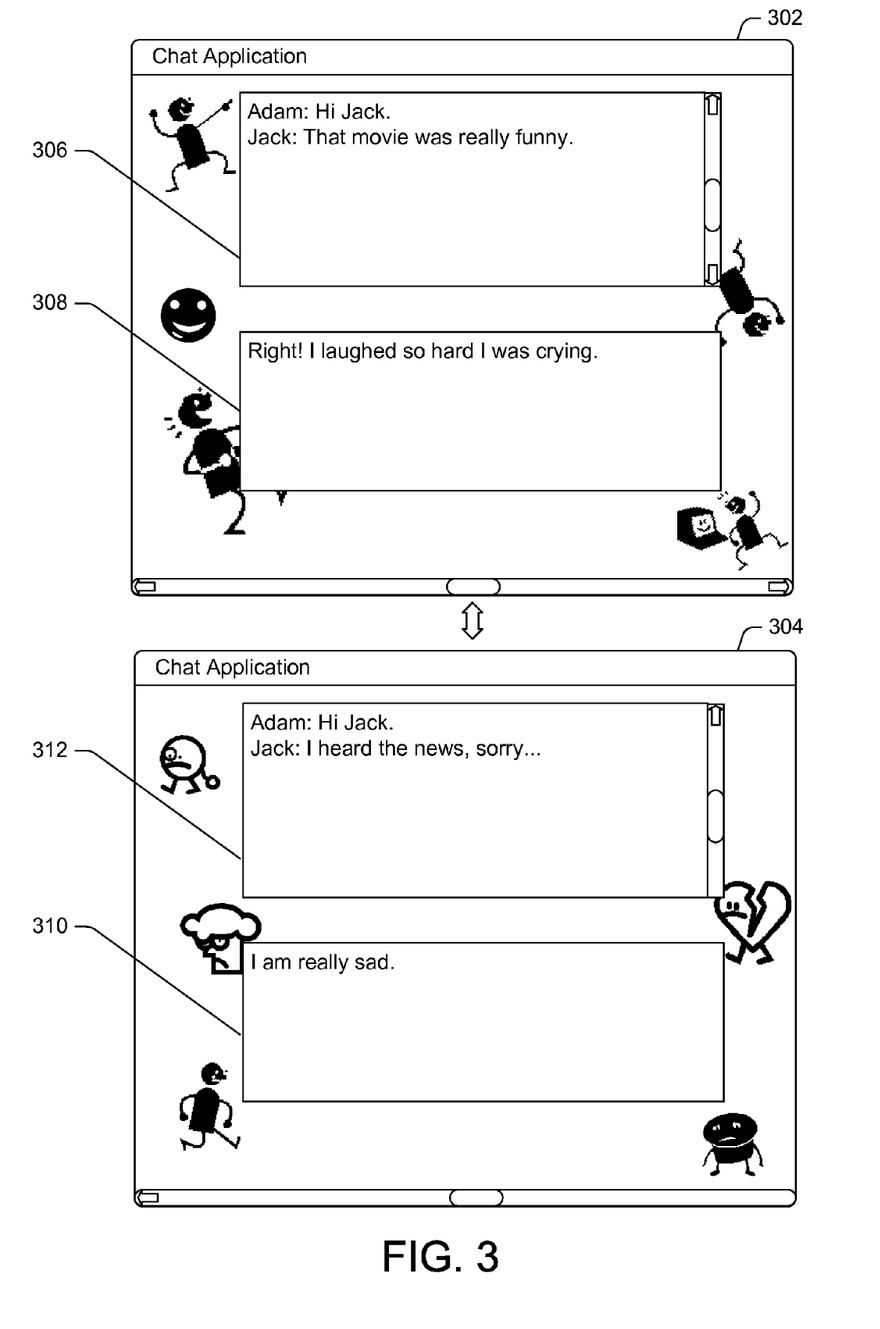
FIG. 3 shows illustrative user interfaces that are customized by the skin application engine according to emotional sentiments of a user.

FIG. 3 shows illustrative user interfaces that are customized by the skin application engine according to emotional sentiments of a user. Each of the user interfaces 302 and 304 may be a user interface for an instant messaging client application. The user interface 302 may include a message input portion 306 that displays messages entered by a user, and a response message portion 308 that displays messages entered by an interlocutor that is chatting with the user. The skin application engine 102 may determine based on the context data in this scenario to apply a "happy" skin package to the user interface 302. The context data may include the content the user inputted into the message input portion 306, among other context information. The "happy" skin package may include cheerful and upbeat images and animations. In some embodiments, the "happy" skin package may also include cheerful and upbeat sounds.

As shown by the user interface 302, because the sentiment analysis module 210 is capable of using normalized context data 106 rather than rely solely on user inputted content to determine an emotional state of the user, the sentiment analysis module 210 may accurately detect the emotional state of the user in many scenarios. For example, the skin application engine 102 may classify the emotional state of the user as "happy" despite the user input of the emotion term "crying" in the message input portion 306. In contrast, a conventional keyword-based sentiment analysis engine may have determined from the presence of the word "crying" that the emotional state of the user is "sad".

Likewise, the user interface 304 may include a message input portion 310 that displays messages entered by a user, and a response message portion 312 that displays messages entered by an interlocutor that is chatting with the user. In contrast to the example above, the skin application engine 102 may determine based on the context data in this scenario to apply a "sad" skin package to the user interface 304. The context data may include the content the user inputted into the message input portion 310, among other context information. As shown, the "sad" skin package may include somber and sympathetic images and animations. In some embodiments, the "sad" skin package may also include somber and sympathetic sounds. Nevertheless, in other embodiments, the skin application engine 102 may apply a different skin package (e.g., a happy skin package) to the user interface 304 for the purpose of altering the emotional state of the user.

Figure 4:
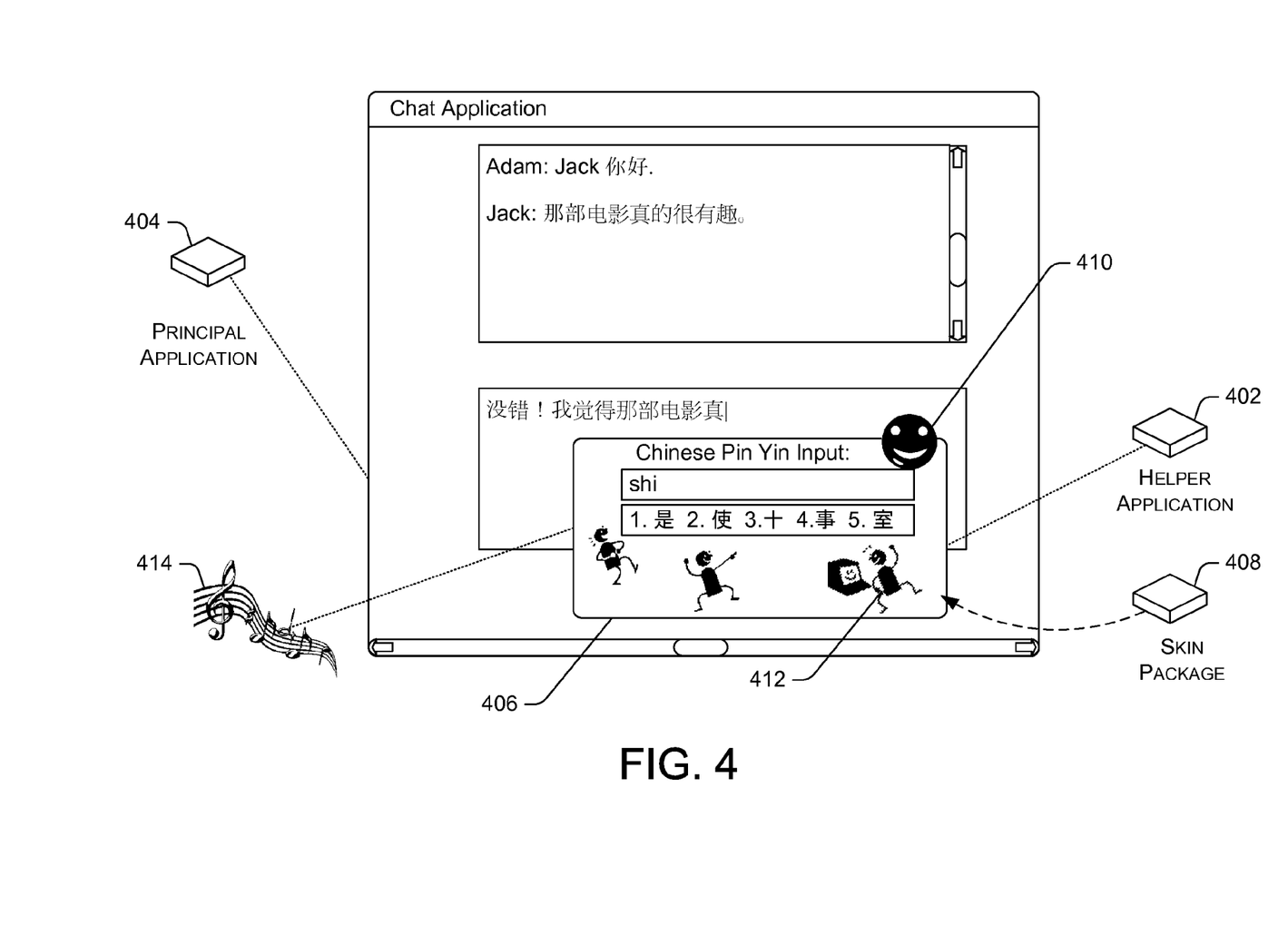
FIG. 4 shows an illustrative user interface of a helper application that is customized by the skin application engine according to an emotional sentiment of a user.

FIG. 4 shows an illustrative user interface of a helper application 402 that is customized by the skin application engine 102 according to an emotional sentiment of a user. The helper application 402 may be a language input method editor that runs cooperatively with another application, such as a principal application 404, to enable the input of non-Roman alphabet characters into the principal application 404. For example, the language input method editor may enable the input of Chinese, Japanese, Korean, or Indic characters into the principal application 404. The principal application 404 may be an instant messaging client application, a word processing application, an email application, etc. In some embodiments, the helper application may be installed on and executed from the electronic device 104. In other embodiments, the helper application 402 may be a cloud-based application that may interact with the principal application 404 without being installed on the electronic device 104.

The skin application engine 102 may customize the user interface 406 of the helper application 402 with a skin package 408 based on context data. The context data may include context information that is related to the helper application 402, the principal application 404, and/or a combination of both applications. For example, the context data may include content that the user inputted into the principal application 404, the helper application 402, or content that the user inputted into both applications.

In some embodiments, the skin package 408 that is applied to the user interface 406 may include an image 410 that protrudes from the user interface 406. Accordingly, the skin package 408 may modify the boundaries of the user interface 406. The skin package 408 may also include an animation 412 and a sound 414.

Example Processes

Figure 5:
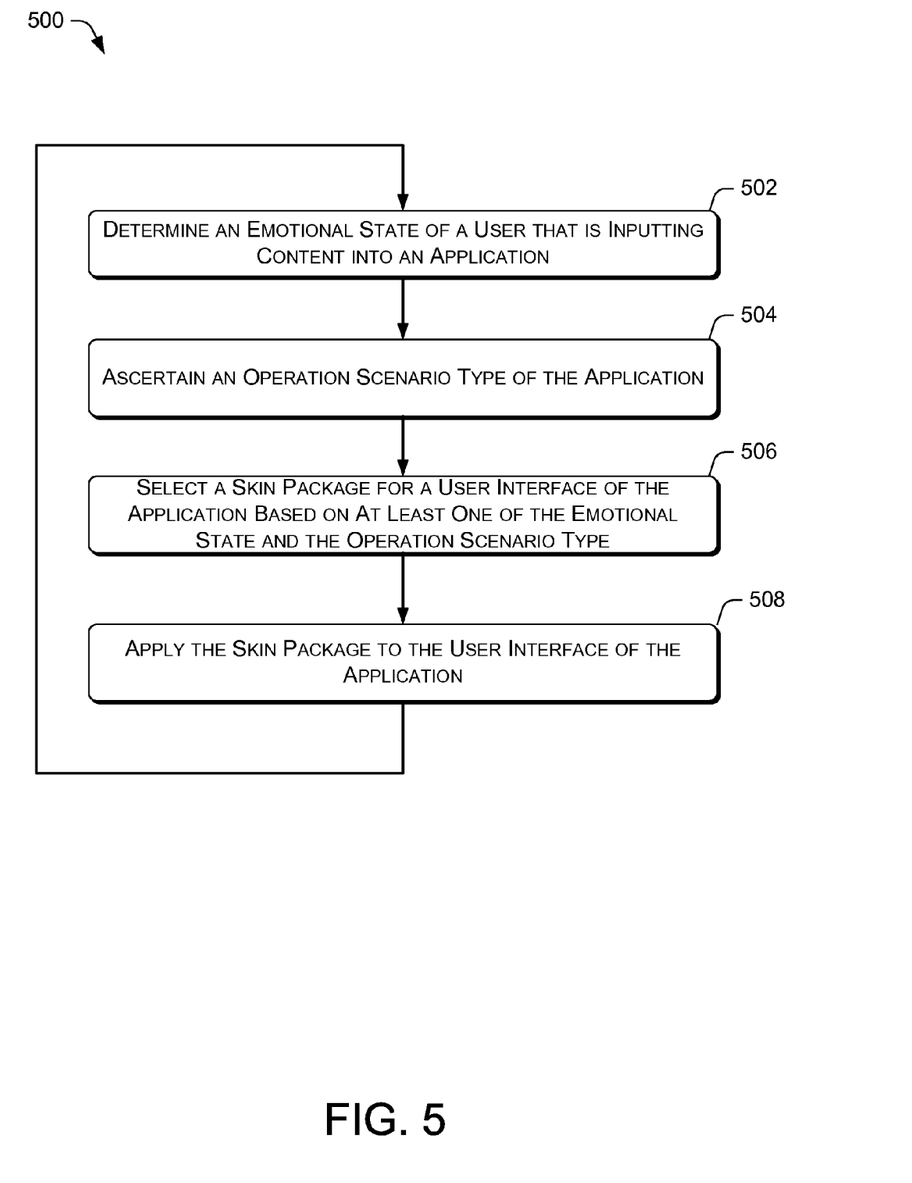
FIG. 5 is a flow diagram that illustrates an example process for selecting and applying a skin package to a user interface of the application based on an operation scenario type and an emotional state.
Figure 6:
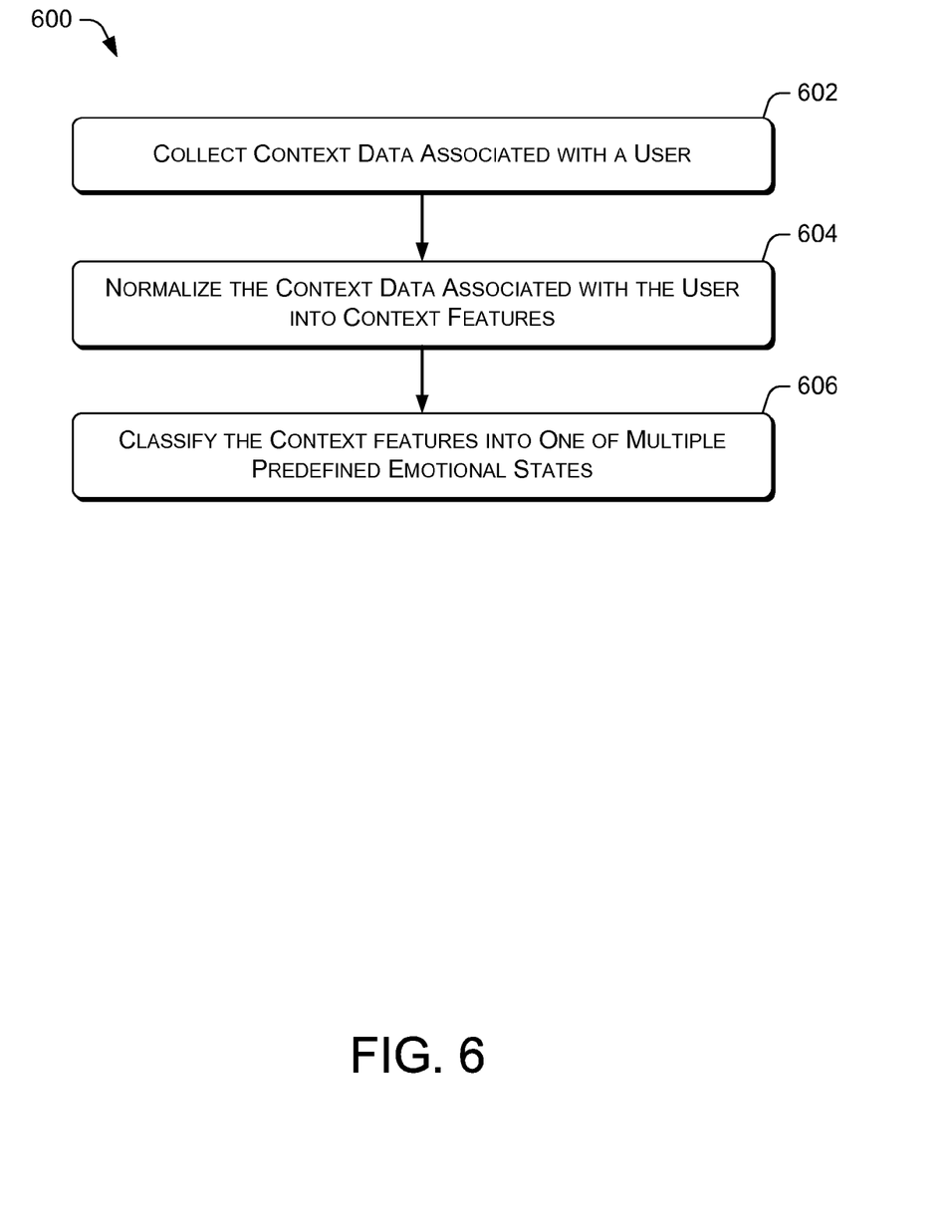
FIG. 6 is a flow diagram that illustrates an example process for classifying context data related to a user into one of multiple predefined emotional states.
Figure 7:
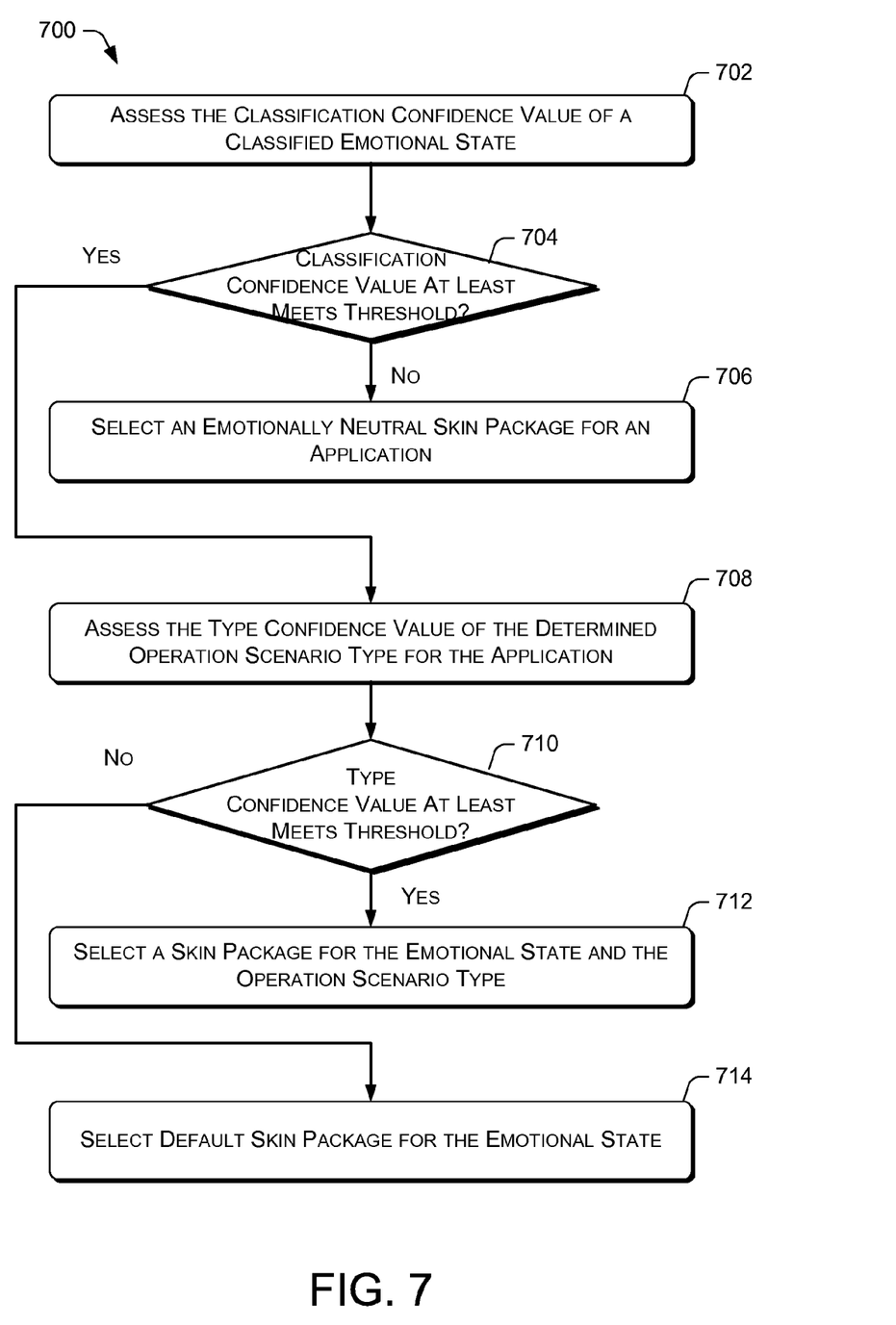
FIG. 7 is a flow diagram that illustrates an example process for selecting a skin package for the user interface of the application by considering the confidence values associated with the operation scenario type and the emotional state.

FIGS. 5-7 describe various example processes for implementing sentiment aware user interface customization. The order in which the operations are described in each example process is not intended to be construed as a limitation, and any number of the described operations can be combined in any order and/or in parallel to implement each process. Moreover, the operations in each of the FIGS. 5-7 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 5 is a flow diagram that illustrates an example process 500 for selecting and applying a skin package to a user interface of the application based on an operation scenario type and an emotional state. At block 502, the sentiment analysis module 210 of skin application engine 102 may determine an emotional state of a user based on received context data 106 associated with a user. The associated context data 106 may include content that the user inputs into the application 108 or communication that the user transmits through the application 108, in conjunction with other sources of data. As a part of the emotional state determination, the sentiment analysis module 210 may further assign a classification confidence value to the determined emotional state.

At block 504, the skin application engine 102 may ascertain an operation scenario type of the application 108. In various embodiments, the application classification module 212 of the skin application engine 102 may continuously or periodically poll the application 108 for application information during the usage of the application 108 by the user. The application information may include data such as application process names, field classes, an application object model, and screen pixel information. Based on such application information, the application classification module 212 may leverage heuristic rules and statistical information to determine that the application 108 is operating in one of the multiple operation scenario types. As a part of the emotional state determination, the application classification module 212 may further assign a confidence value to the determined emotional state.

At block 506, the skin application engine 102 may select a skin package from the skin package repository 116 for a user interface of the application. In various embodiments, the skin selection module 214 of the skin application engine 102 may make the selection based on at least one of the determined emotional state of the user and the operation scenario type of the application, as well as their respective confidence values. In some instances, the skin package that is selected by the skin application engine 102 may reflect the determined emotional state. In other instances, the skin application engine 102 may select the skin package to alter the emotional state of the user. The selected skin package may include images, animation, and/or sound that provide a full multimedia experience to the user.

At block 508, the skin application engine 102 may apply the selected skin package to the application 108. Thus, the skin package may change the user interface appearance of the application 108, as well as provide additional features that are previously unavailable in the user interface of the application 108. Such additional features may include the ability to play certain sounds or animate a particular portion of the user interface. Subsequently, the process 500 may loop back to block 502 so that the skin application engine 102 may reassess and determine the emotional state of the user based on newly received context data, and apply a new skin package if the emotional state of the user changes.

In some embodiments, rather than determining the emotional state of the user, the skin application engine 102 may obtain an emotional state of an interlocutor that is engaged in an online interaction with the user. Accordingly, the skin package selected for the application 108 may be based on the received context data associated with the interlocutor.

FIG. 6 is a flow diagram that illustrates an example process 600 for classifying context data related to a user into one of multiple predefined emotional states. The process 600 may further describe block 502 of the process 500.

At block 602, the context collection module 206 may collect context data 106 associated with a user. The associated context data may include content that the user inputs into the application 108 or communication that the user transmits through the application 108, in conjunction with other sources of data in a recent time period. The other sources of may include application specific data, environmental data, and/or user status data from a recent time period. Each of the recent time periods may have a predetermined duration. The types and/or sources of context data that the context collection module 206 collects may be configured by the user.

At block 604, the context normalization module 208 may normalize the context data 106 into context features. Each of the context features may be expressed as a name value pair. In one instance, a name value pair may be "weather: 1", in which the value "1" represents that the weather is sunny. In another instance, the name value pair may be "application type: 3", in which the value "3" represents that the application 108 is an instant messaging client application.

At block 606, the sentiment analysis module 210 may classify the context features into one of the multiple predefined emotional states. The sentiment analysis module 210 may also generate a classification confidence value for the classification. The classification confidence value may be expressed as a percentage value or a numerical value in a predetermined value scale. In various embodiments, the sentiment analysis module 210 may use one or more machine learning and/or classification algorithms to classify the context features into one of the predefined emotional states 110 and generate a corresponding classification confidence value.

FIG. 7 is a flow diagram that illustrates an example process 700 for selecting a skin package for the user interface of the application by considering the confidence values associated with the operation scenario type and the emotional state. The process 700 may further describe block 506 of the process 500.

At block 702, the skin selection module 214 may assess the classification confidence value of a classified emotional state. The classified emotional state may have been selected from multiple predefined emotional states 110 by the sentiment analysis module 210 based on the context data 106 related to a user. Accordingly, if the skin selection module 214 determines that the classification confidence value does not meet a corresponding predefined confidence threshold ("no" at decision block 704), the process 700 may continue to block 706. At block 706, the skin selection module 214 may determine that the emotional state of the user is unknown. Accordingly, the skin selection module 214 may select an emotionally neutral skin package for an application.

In some embodiments, the emotional neutral skin package selected by the skin selection module 214 may be a skin package that corresponds to the operation scenario type of the application 108. In such embodiments, the emotionally neutral skin package may be selected from multiple emotionally neutral skin packages.

Returning to decision block 704, if the skin selection module 214 determines that the classification confidence value at least meets the corresponding predefined confidence threshold ("yes" at decision block 704), the process 700 may continue to block 708.

At block 708, the skin selection module 214 may assess the type confidence value of the determined operation scenario type for the application 108. The operation scenario type of the application 108 may be determined from application information such as application process names, field classes, an application object model, and screen pixel information. Accordingly, if the skin selection module 214 determines that the type confidence value at least meets a corresponding predefined confidence value ("yes" at decision block 710), the process 700 may continue to block 712.

At block 712, the skin selection module 214 may select a skin package for the emotional state and the operation scenario type of the application 108. In some instances, the skin package that is selected by the skin selection module 214 may reflect the emotional state. In other instances, the selected skin package may alter the emotional state.

Returning to decision block 710, if the skin selection module 214 determines that the type confidence value does not meet a corresponding predefined confidence value ("no" at decision block 710), the process 700 may continue to block 714. At block 714, the skin selection module 214 may select a default skin package for the emotional state. The default skin package may be a skin package that corresponds to or alters the emotional state, but which is one of the most formal skin packages.

The sentiment aware customization of the user interface of an application with a skin package based on context data that includes an emotional state of a user may strengthen the emotional attachment for the application by the user. Accordingly, the user may become or remain a loyal user of the application despite being offered similar applications from other vendors. Further, the sentiment aware customization may be applied to a variety of software. Such software may include, but are not limited to, office productivity applications, email applications, instant messaging client applications, media center applications, media player applications, and language input method editor applications.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A computer storage medium storing computer executable instructions that, when executed, cause one or more processors to perform acts comprising:
receiving a user selection, the user selection identifying:
one or more sources from which context data is to be used for generating emotional state determinations, the one or more sources including an application, and
one or more other sources from which context data is not to be used for making emotional state determinations;
determining an emotional state of a user that is inputting content into the application, the content including inputted textual communication for transmission to another application through the application as part of an online chat session, and the emotional state being determined based at least partly on at least one word or phrase in the textual communication being associated with the emotional state;
determine a classification confidence value for the determination of the emotional state of the user;

selecting a skin package for a user interface of the application based at least on the classification confidence value for the emotional state meeting a confidence value threshold; and applying the skin package to the user interface of the application to at least alter an appearance of the user interface.

2. The computer storage medium of claim 1, further comprising ascertaining an operation scenario type of the application, the operation scenario type corresponding to a usage formality of the application, wherein the selecting includes selecting a skin package for a user interface of the application based on the emotional state and the operation scenario type.

3. The computer storage medium of claim 2, wherein the ascertaining includes:

polling the application for application information that includes one or more of application process names, field classes, an application object model, and screen pixel information of output data generated by the application; and classifying the application as operating in one of multiple operation scenario types and generating a type confidence value for the classifying based at least on the application information.

4. The computer storage medium of claim 3, wherein the skin package is one of a first skin package or a second skin package, and wherein selecting includes:

selecting the first skin package that corresponds to the emotional state and a usage formality of the application indicated by the operation scenario type of the application when the type confidence value at least meets a corresponding predefined confidence threshold; and selecting the second skin package that corresponds to the emotional state and a most formal usage formality when the type confidence value is below the corresponding predefined confidence threshold.

5. The computer storage medium of claim 2, wherein the operation scenario type is one of a plurality of operation scenario types that include an online chat scenario and a document authoring scenario.

6. The computer storage medium of claim 5, wherein the determining includes: normalizing the context data into context features that are expressed as name value pairs.

7. The computer storage medium of claim 6, wherein the skin package for a user interface is a first skin package for a user interface, and wherein the selecting includes:

selecting a second skin package that corresponds to a neutral emotional state when the classification confidence value is below the confidence value threshold.

8. The computer storage medium of claim 5, wherein the context data includes at least one of application specific data, environmental data, or user status data.

9. The computer storage medium of claim 8, wherein the environmental data includes at least one of data on a real-world environment, a software status or event of an electronic device that is executing the application, or a hardware status or event of the electronic device.

10. The computer storage medium of claim 8, wherein the user status data includes data collected from personal web services used by the user that provide implicit or explicit clues regarding the emotional state of the user.

11. The computer storage medium of claim 1, wherein the skin package includes an image and at least one of a sound or an animation.

12. The computer storage medium of claim 11, wherein the animation is displayed according to an emotion term inputted into the application by the user.

13. The computer-readable storage medium of claim 1, wherein selecting a skin package for a user interface of the application is further based at least on an emotional state of a second user associated with the user.

14. A computer-implemented method, comprising: receiving a user selection, the user selection identifying:

one or more sources from which context data is to be acquired, the one or more sources including a principle application, and one or more other sources from which context data is not to be used for making emotional state determinations;

determining, based at least in part on the context data, an emotional state of a user that is inputting content into the principal application;

ascertaining a level of formality associated with a current operation scenario;

selecting a skin package for a user interface of a language input method editor application that is executing cooperative with the principal application based on the emotional state and the level of formality associated with the current operation scenario; and applying the skin package to the user interface of the language input method editor application to alter the user interface, the skin package including an image and at least one of a sound and an animation.

15. The computer-implemented method of claim 14, wherein the selecting includes selecting the skin package to reflect or alter the emotional state of the user.

16. The computer-implemented method of claim 14, wherein the principal application is a communication application, further comprising applying the skin package to an additional user interface of another communication application that is used to send communication to the instant messaging client application.

17. The computer-implemented method of claim 14, wherein the determining includes:

translating content that is inputted into the principal application from a first language into a second language; and determining the emotional state of the user based on context data that includes the content that is in the second language.

18. A computing device, comprising:

one or more processors; and a memory that includes a plurality of computer-executable components, the plurality of computer-executable components comprising:

a sentiment analysis component that:

receives a user selection, the user selection identifying:

one or more sources from which context data is to be used, the one or more sources including an application, and one or more other sources from which context data is not to be used for making emotional state determinations;

determines an emotional state of a user that is inputting content into the application based on the context data, the context data including content inputted into the application by the user or communication that the user transmitted through the application; and determines a classification confidence value for the determination of the emotional state of the user;

an application classification component that ascertains a social context for an operation of the application, the social context being selected from multiple social contexts that include a professional environment or a casual social environment;

a skin selection component that selects a skin package for a user interface of the application based on the emotional state and the social context for the operation of the application, the skin package including an image and at least one of a sound and an animation; and a skin renderer component that applies the skin package to the user interface of the application.

19. The computing device of claim 18, further comprising a skin design component that enables a designer to create the skin package using at least one of an assistant functionality or one or more skin templates.

\* \* \* \* \*